Patented Oct. 16, 1951

2,571,090

UNITED STATES PATENT OFFICE 2,571,090

FLUOROHYDROCARBON SUBSTITUTED METHYLSILOXANES

Charles F. Kohl, Jr., Pittsburgh, Pa., assignor to Corning Glass Works, Corning, N. Y., a corporation of New York No Drawing. Application October 27, 1949, Serial No. 123,992

6 Claims. (Cl. 260—448.2)

The present invention relates to a new class of organosilanes and to methods for their preparation.

In general in the organosilicon art the organic radicals which are linked to silicon are monovalent hydrocarbon radicals. U. S. Patent 2,258,-219 describes the preparation of chlorophenylsilicon chlorides and fluorophenylsilicon chlorides. The hydrolyzates of these silanes are readily condensable similarly to silanes which do not contain halogen substituents in the organic radicals.

I have shown that the hydrolysis of silanes in which all of the substituents are chlorine, trifluorotolyl and hexafluoroxylyl produces stable silanols which are resistant to condensation to siloxanes. This resistance to condensation of the silanols appears to be due to the presence on the silicon atoms of trifluoromethyl substituted phenyl radicals.

Objects of the present invention are to provide siloxanes, the silicon atoms of which carry trifluoromethyl substituted phenyl substituents on the silicon atoms.

Siloxanes in accordance herewith are of the general formula:

in which $n$ is a positive integer less than 3 and $x$ has an average value of from 3 to 10, inclusive.

The siloxanes hereof may be produced by any suitable method, as for example, by the hydrolysis of the corresponding dichlorosilanes followed by the condensation of the hydrolysis product. The corresponding dichlorosilanes may be produced by any suitable method, as for example, the interaction of methyltrichlorosilane with a Grignard reagent prepared by reacting a trifluoromethyl substituted bromobenzene with magnesium at a temperature below 80° C. The Grignard reagent so produced is reacted with methyltrichlorosilane. The coupling of the Grignard reagent with the chloride is effected at a temperature below 80° C.

The preparation of fluoromethyl substituted phenyl bromide by the bromination of trifluoromethylbenzenes has been described by Simons and Ramler in 1943 in the Journal of the American Chemical Society, volume 65, page 389. In accordance with this method the bromination is effected in liquid phase at 60° C. They indicated that the compounds obtained were exclusively those in which the bromine was in meta position.

Bromination of these compounds can also be obtained by passing a mixture of the fluorohydrocarbon and bromine in vapor phase through a reactor at a temperature in the range of 700 to 900° C. By this method the ortho compounds can be obtained as well as the meta compounds, together with small amounts of the para derivative.

One suitable compound for the preparation of the bromide is trifluoromethylbenzene. Other bromides may be prepared from the bis(trifluoromethyl)benzenes such as the compounds of this type in which the two trifluoromethyl radicals are in the 1,3 and 1,4 positions.

The Grignard reagents are produced by reacting the bromides as above described with magnesium. It should be noted that great care should be employed in the preparation and handling of these Grignard reagents inasmuch as violent explosions may occur, particularly if the temperature limit herein stated is exceeded. In the reaction of these bromides with the magnesium, the temperature should be held below 80° C. It is also of assistance in preventing detonation of these materials to operate in the presence of a solvent such as ether, or a low boiling hydrocarbon. The chlorine analogues of the above bromides do not appear to form Grignard reagents under the conditions stated.

The Grignard reagents so produced are then reacted with methyltrichlorosilane. The methyltrichlorosilane is mixed with the Grignard reagent and maintained at below 80° C. The coupling reaction proceeds with relative ease.

In making the coupling, the silicon chloride is employed in amount at least equivalent to the amount of Grignard reagent employed. Preferably less than ten equivalents of the silicon chloride are present per equivalent of the Grignard reagent.

The products of the coupling reaction are of the type:

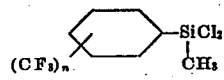

in which $n$ is a positive integer less than 3.

The siloxanes hereof are exceedingly stable even in the presence of air at high temperatures, as for example, 250° C. Accordingly, they are of utility as hydraulic fluids, particularly in situations where high temperature lubrication is necessary. Furthermore, these materials may be of utility in the prevention of foaming in aqueous and nonaqueous systems. Also these materials may be of utility as plasticizers for fluoro carbon polymers.

The present invention is a continuation in part of my application, Serial Number 786,541, filed November 17, 1947.

The following examples illustrate the present invention:

Example 1

Trifluoromethylphenyl bromide was reacted with an equivalent amount of metallic magnesium in the presence of 500 cc. of diethyl ether per 225 grams of the bromide. The Grignard reagent so produced was reacted with methylsilicon trichloride in the amount of one mol of the Grignard reagent per two mols of the silicon chloride. The magnesium halide salt which was precipitated was separated from the ethereal solution.

The solution was distilled, and the following products were recovered:

| | B. P., °C. | $D_{25°/4°}$ | $n_D^{25}$ |
|---|---|---|---|
| (1) $F_3CC_6H_4CH_3SiCl_2$ | 115.5 at 50 mm. | 1.3436 | 1.4639 |
| (2) $(F_3CC_6H_4)_2CH_3SiCl$ | 123 at 4 mm. | 1.3535 | 1.4841 |

Compound (1) was a low viscosity fluid. This chloride was dissolved in diethyl ether. Water in excess was added to the ethereal solution. The hydrolyzate was a low viscosity oil of 100 centistokes at room temperature which did not crystallize. While polymeric dimethyl silicone forms a gel when exposed to air at 250° C., for eighteen hours, the hydrolyzate of compound (1) did not become solid until it had been held for five hundred hours under these conditions. Even after the material had the appearance of being a solid, it had not gelled, inasmuch as it was still soluble in acetone. Upon addition of concentrated sulphuric acid to the hydrolyzate, in amount such as is employed to effect the polymerization of dimethylsiloxane, no polymerization of the hydrolyzate was effected. Neither the chloride nor the hydrolyzate were decomposed by boiling fuming sulphuric or fuming nitric acid.

This hydrolyzate was subjected to distillation in a molecular still. Two high boiling fractions were obtained which had the following properties:

| | $n_{25}°$ C. | $D^{25°/4°}$ | Sp. Ref. |
|---|---|---|---|
| Cut 1 | 1.4698 | 1.318 | 0.2117 |
| Cut 2 | 1.4701 | 1.319 | 0.2116 |
| Residue | 1.4739 | 1.339 | 0.2099 |

Cuts 1 and 2 are cyclic siloxanes of the formula above stated, in which the cyclic structure is cyclic trisiloxane and cyclic tetrasiloxane. The residue contained cyclic siloxanes of the formula indicated, in which the value of $x$ is equal to as high as 10.

Example 2

Compounds of the formula:

where $x$ has a value of from 3 to 10, inclusive.

At a temperature of 0° C., butyl chloride in amount of 372 grams was added to 75 grams of metallic lithium in the form of shot suspended in one liter of ether. An atmosphere of helium was maintained in the reaction vessel during the preparation of the butyl lithium. After standing overnight, an additional 97 grams of butyl chloride were added at 0° C. The reaction mixture was then warmed to room temperature. The mixture was then cooled to −15° C. and 5 gram mols of xylylhexafluoride were added rapidly. The mixture was allowed to warm slowly. Butane was evolved when the temperature reached 15° C. In this manner hexafluoroxylyllithium was produced.

The lithium derivative produced as above described was added to 10 gram mols of methyltrichlorosilane at between −10° and 0° C. The reaction mixture was then heated to cause refluxing of the ether. The product was filtered to remove the salt and strip distilled to remove the ether. Residue of 990 grams of product was obtained. This product was fractionally distilled in a Podbielniak still. Upon distillation two plateaus were observed, one at 98.3° C. at a pressure of 25.5 mm. of mercury, and the other at 100.7° C. at 24 mm. of mercury. Each of these plateaus includes various isomers. However, both plateaus were relatively pure mixtures of isomers having the formula:

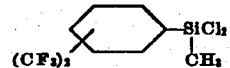

These two cuts were next dissolved in benzene and hydrolyzed by shaking with the amount of water theoretically necessary to effect hydrolysis of the silicon bonded chlorine. The hydrolysis product was washed with additional water and finally with dilute sodium bicarbonate solution. The product was again washed with water and enough benzene was added to make the product layer of lower specific gravity than water. This solution of product in benzene was refluxed in mixture with water for four hours. The benzene solution of product was then dried in contact with sodium sulphate. The benzene was strip distilled from the product and the product then distilled under vacuum. By distillation at .4 mm. mercury, symmetrical trimethyl tris(hexafluoroxylyl) cyclotrisiloxane was obtained which had a boiling point of 169° C. at the pressure employed. This material had the properties: $n_{25°}$ of 1.4380; $D^{25°/4°}$ of 1.483; and a specific refraction of 0.1770. Higher cyclic methyl(hexafluoroxylyl)polysiloxanes were obtained as a residue which cyclic siloxanes contained materials having up to about 10 polymer units per cycle. This residue was a highly viscous water white fluid.

The specific refractions referred to above may be compared with theoretical bond refractions computed in accordance with the method described by E. L. Warrick, Journal of the American Chemical Society, volume 68 (1946), page 2455.

That which is claimed is:

1.

in which $n$ is a positive integer less than 3 and $x$ has an average value of from 3 to 10 inclusive.

2.

in which $x$ has an average value of from 3 to 10 inclusive.

3. 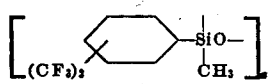
in which $x$ has an average value of from 3 to 10 inclusive.
4. 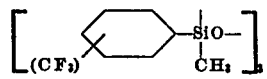
5. 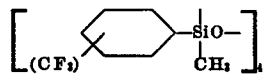
6. Symmetrical trimethyltris(hexafluoroxylyl)-cyclotrisiloxane.
CHARLES F. KOHL, JR.
REFERENCES CITED
The following references are of record in the file of this patent:
UNITED STATES PATENTS
| Number | Name | Date |
|---|---|---|
| 2,258,219 | Rochow | Oct. 7, 1941 |
| 2,258,222 | Rochow | Oct. 7, 1941 |